United States Patent
Marsh, Jr. et al.

[15] 3,642,560
[45] Feb. 15, 1972

[54] COMPOSITE ARTICLES INCLUDING BONDED FIBROUS GLASS WITH SAID ARTICLES HAVING DENSITY GRADIENTS

[72] Inventors: Henry N. Marsh, Jr.; Barclay P. Gano, both of Granville, Ohio
[73] Assignee: Owens-Corning Fiberglas Corporation
[22] Filed: Apr. 1, 1968
[21] Appl. No.: 717,494

[52] U.S. Cl. ............................ 161/39, 161/48, 161/116, 161/124, 161/170, 264/109, 264/118, 264/163, 264/274, 280/150 AB
[51] Int. Cl. ........................................ B32b 1/00, B32b 5/14
[58] Field of Search ........................................ 161/38–40, 48, 161/124, 169, 170, 116, 401; 264/109, 118, 163, 274; 280/150 AB

[56] References Cited

UNITED STATES PATENTS 2,938,737  5/1960  Walker .......................... 280/150
3,113,788  12/1963  Johnston ........................ 280/150
3,147,176  9/1964  Haslam .......................... 161/39

OTHER PUBLICATIONS

Sonneborn et al, Fiberglas Reinforced Plastics", 1954, page 152, Figure 157

Primary Examiner—John T. Goolkasian
Assistant Examiner—Joseph C. Gil
Attorney—Staelin & Overman and William P. Carr

[57] ABSTRACT

Articles including molded bodies of bonded fibrous glass integrated with more rigid members with comparatively rigid areas of the bodies coextensive with the rigid members and methods utilizing heat and pressure for simultaneously shaping the fibrous glass bodies and integrating the rigid members therewith.

7 Claims, 9 Drawing Figures

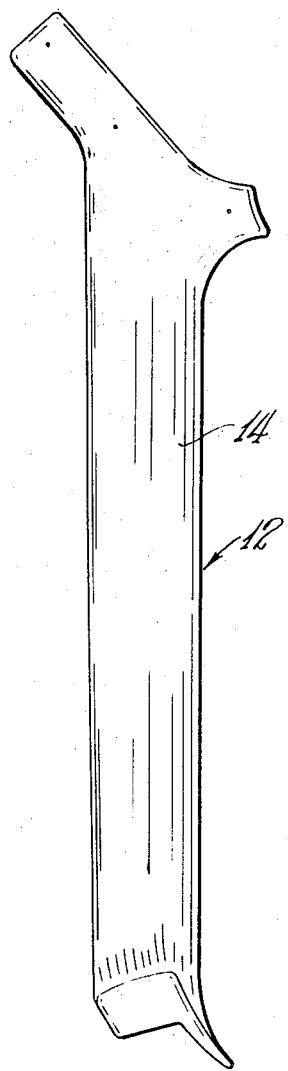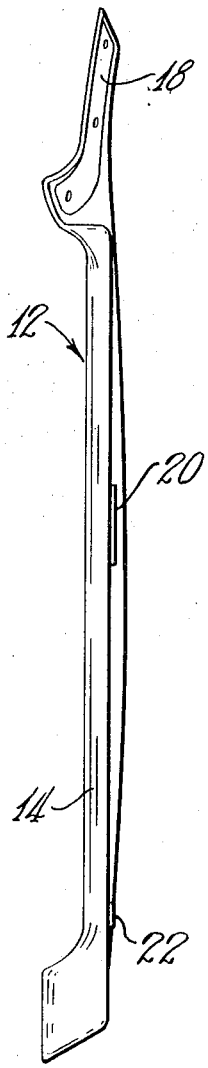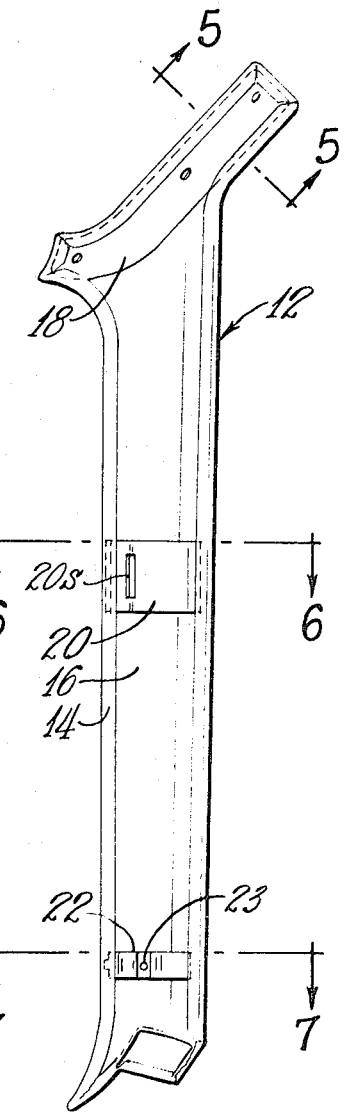

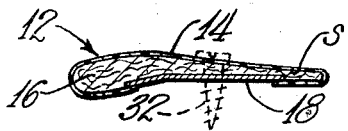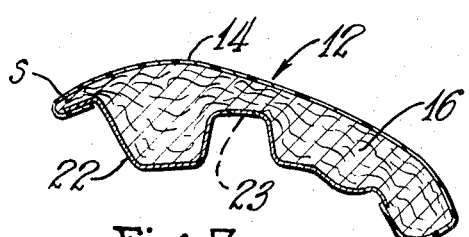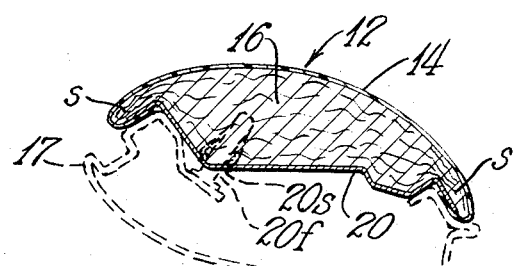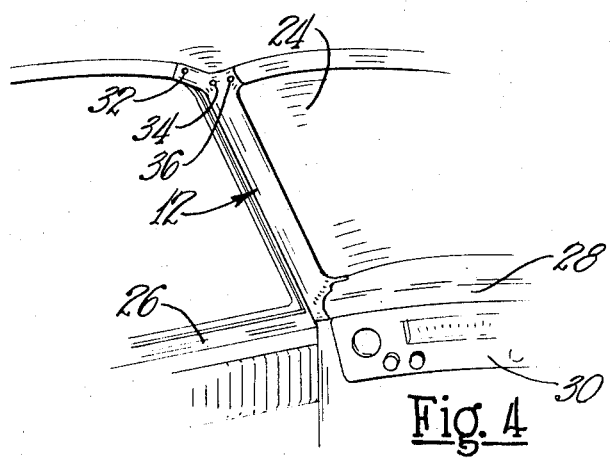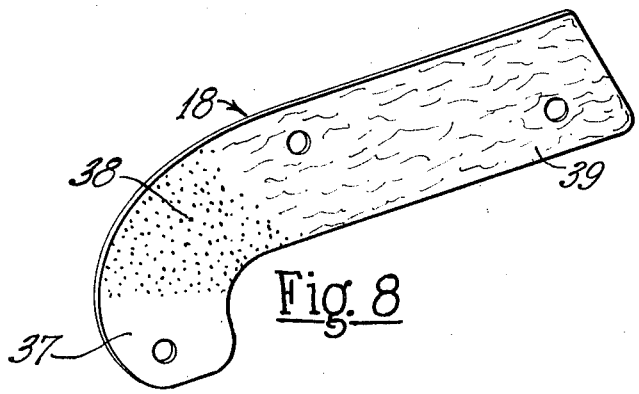

HENRY N. MARSH, JR. &
BARCLAY P. GANO
INVENTORS

BY
Staelin & Overman
ATTORNEYS

COMPOSITE ARTICLES INCLUDING BONDED FIBROUS GLASS WITH SAID ARTICLES HAVING DENSITY GRADIENTS

This invention relates to the molding of fibrous glass bodies impregnated with a settable binder and to securing said bodies in an integrating manner to rigid, preferably metal members.

More specifically the invention pertains to the molding of a crash pad of bonded fibrous glass with integrated metal fasteners by which it may be attached to a corner post of an automobile such as the front or "A" pillars between which the windshield extends.

In furthering their efforts to protect the occupant from injury in automobile accidents the manufacturers have placed crash pads over instrument panels, applied cushioning material to visors, adopted headliners of compressible fibrous glass and have otherwise modified, covered or replaced with articles of crushable or compressible material those metal members in the interior of automobiles against which an occupant may be thrown when the automobile is involved in a severe collision.

These various safety-promoting products have generally been attached with adhesives or with edge clips and have usually provided surface padding over conventional structural elements.

The principal object of this invention is the provision of a method for integrating a fibrous glass body with a rigid supporting or structural member while the fibrous glass body is shaped and the binder therein is cured thus producing a composite article mountable generally independently of or structurally supplementing associated elements.

Another object of the invention is the utilization of a fibrous glass body as a form-completing and structural part of a more rigid member.

A further object is the integration of fastening strips preferably of metal composition with a fibrous glass body.

A more specific object of the invention is a fibrous glass body with highly densified areas adjacent to fastening members and having comparable rigidity and strength as said members.

Another more particular object of the invention is a crash pad with integrated hanging strips for mounting upon a corner post of an automobile body.

Other objects include a method for preparing the surfaces of metal members for attachment to a fibrous body and a method for simultaneously shaping the fibrous body and curing the binder thereof while the metal members are attached.

These and additional objects and advantages of the invention will be explained at greater length in the following description with reference to the accompanying drawings in which:

FIG. 1 is a front elevation of a crash pad for a corner post of an automobile which embodies one form of the invention;

FIG. 2 is a side view of the crash pad of FIG. 1;

FIG. 3 is a rear view of the crash pad of FIGS. 1 and 2;

FIG. 4 shows the crash pad of the preceding figures installed over the left front corner post or "A" pillar of an automobile;

Figure 9:
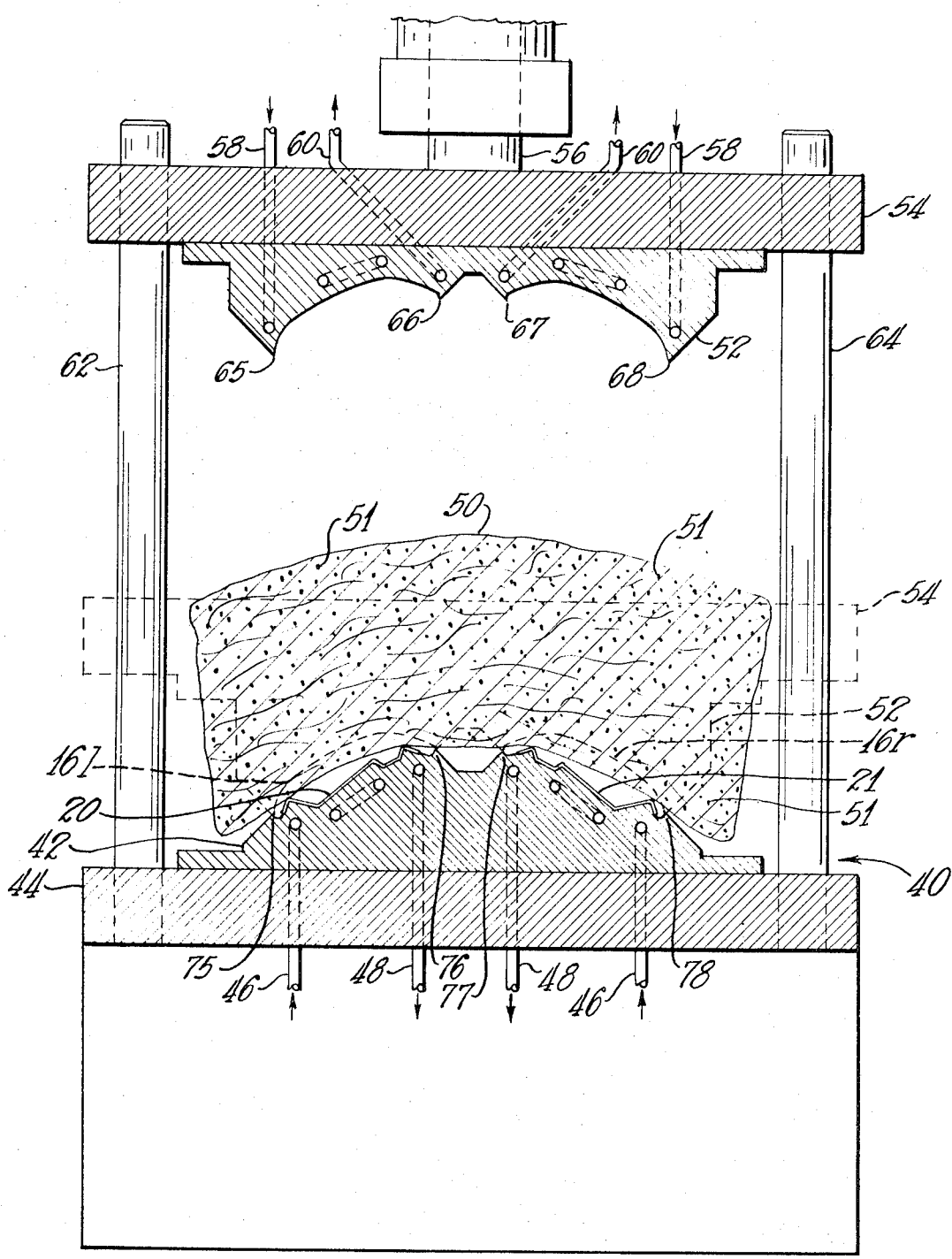

FIGS. 5, 6 and 7 illustrate cross sections of the crash pad on an enlarged scale as respectively seen from lines 5—5, 6—6, and 7—7 of FIG. 3;

FIG. 8 shows one of the fastening strips integrated with the fibrous glass body of the crash pad; and FIG. 9 is a vertical section of a molding press adapted to shape and cure two of the fibrous glass crash pad bodies while securing the fastening strips thereto.

Referring to the drawings in more detail the crash pad 12 of FIGS. 1 through 7 has an imitation leather decorative covering sheet 14 such as a vinyl modified acrylonitrile butadiene styrene polymer which is applied under vacuum with an adhesive, which may be either a nitrile phenolic polymerizing under the heat of the vinyl sheet application or a solvent contact type such as a neoprene, to the fibrous glass body 16 after the latter is formed.

The metal fastening strips 18, 20 and 22 are secured to the fibrous body 16 during the molding operation. As shown in FIGS. 5, 6 and 7 these strips are slightly embedded in the fibrous body to an extent making the outer surfaces of the strips flush with the adjoining outer surface of body 16.

In the heavily compacted areas S of the fibrous glass body 12, indicated in FIGS. 5, 6 and 7, the body is rigid and substantially solid with the fibers held tightly together by the resinous bonder. These rigid areas are coextensive with portions of the strips and extend beyond the ends of the strips. They thus form structural continuations of the strips with comparable strength and rigidity. The density of the areas S approaches that of solid resinous bodies reinforced with fibrous glass and generally exceeds 20 pounds per cubic foot and reaches in part as high as 60 pounds per cubic foot.

The metal strip 18 set in the upper end of the crash pad 12 has holes for the passage of retaining screws 32, 34 and 36 as shown in FIG. 4, wherein the crash pad is shown in place over the left forward post or "A" pillar of the automobile body which is located between the windshield 24 and the left front door 26. The conventional crash pad 28 is shown extending over the instrument panel 30.

The strip 20 has a vertical slot 20s therein for receipt of a spring clip projecting from the "A" pillar while the lowest clip 22 is ported at 23 for receiving a locating pin fixed to the "A" pillar.

One design of molding apparatus suitable for producing the crash pad of this invention is shown in FIG. 9. The molding apparatus 40 there depicted has a male mold 42 mounted on the lower platen 44. The mold 42 is cored for passages of a heating fluid therethrough with inlets 46 and outlets 48 extending through the platten 44. Hot oil serves very well as the heating medium.

The temperature required would vary according to the size of the fibrous glass body but in this instance would be in the region of 500° F. with the mold closed for 2½ to 3 minutes.

The upper female mold 52 is mounted on the carrier platen 54 which is driven downwardly to close the mold by the hydraulic plunger 56. The upper mold is also cored to provide passages for the heating fluid with inlets 58 and outlets 60 therefor.

As may be noted the molding apparatus 40 is designed to shape a pair of the crash pads in each cycle—one for the left "A" pillar and one for the right "A" pillar. Each side of the mold is adapted to receive a set of the fastening strips.

The sectional view in FIG. 9 of the molding press is taken through the longitudinal midpoint of the formed crash pads so the intermediate fastening strip 20 is shown on the left side of the mold as it lies fitted to the mold and held in position by a magnet. A reversed shaped strip 21 is depicted in place on the right hand side of the mold where the crash pad for the right hand "A" pillar is shaped.

Before the metal strips are positioned in the mold they are coated with a resinous adhesive. This is effected in a satisfactory and economical manner with steel strips by having the strips first cleaned and zinc coated. Alternately, they may be given a protective phosphate treatment. The strips are thus provided with uniform surface characteristics including a minute roughening for improved keying with the adhesive.

The strips are heated to 325° F. After they are withdrawn from the heating zone powdered resin is sprinkled over the faces of the strip which will abut the fibrous glass body. The residual heat melts the powdered resin and induces a flow thereof to spread the resin in a fairly continuous tacky film. The heat is not sufficient to cure the resin but only to bring it to a B-stage condition to be further fluidized and set through the heat of the molding operation. A phenolic resinous adhesive which serves very satisfactorily is known commercially as Durez No. 12687 and is a product of the Hooker Chemical Company.

This coating process as applied to the attaching strip 18 is illustrated in FIG. 8. The zinc-coated or phosphate-treated surface is indicated at 37, the powdered resin at 38, and the fluidized resin at 39.

A blank 50 of fibrous glass preferably in two layers, each about 2 inches thick with a nominal density of 1.08 pounds per cubic foot and impregnated around twenty four per cent by weight with a standard phenolic formaldehyde binder 51, is placed over the lower male mold 42. Small supplemental pads of the fibrous glass may be included to increase the ultimate density at selected areas. The fibers utilized in the fibrous body would desirably be of a size with diameters between fifteen and thirty five hundred thousandths of an inch.

Other effective binder material may have compositions of urea formaldehyde, epoxies, polyesters or melamines. Such thermosetting compositions are considered most suitable although thermoplastic binders while less satisfactory, could be utilized.

The upper female mold 52 is forced downwardly on guideposts 62 and 64 until the sheer edges thereof 65, 66, 67 and 68 meet opposite sheer edges 75, 76, 77 and 78 in the lower mold. At this point the fibrous glass blank has been compressed to the outline 16l on the left side of the mold and the outline 16r on the right side of the mold.

The abutment of the sheer edges leaves trim material along the longitudinal center of the mold and at the sides thereof. This trim is easily broken away by hand if not severed in the molding operation.

In the molding operation the pressure forces the resin coating on the strips into the fibrous glass stock as well as further spreading the coating over the surfaces of the strips. The pressure also brings the resin coating into joining contact with the compatible resinous binder with which the fibrous glass stock is impregnated.

The compacted areas of the fibrous body approach the metal strips in strength and thereby act as physical extensions of the strips. However, the main areas of the crash pads remain compressible and crushable to curtail injury to occupants thrown forwardly against them with densities running upwardly from around 6 pounds per cubic foot. These areas are spanned by the metal strips and are supplementally supported therethrough.

The feature of the invention where the fibrous glass body completes a structural form as illustrated in FIG. 6. The fibrous body 12 there constitutes one side of the post 17 to which it is secured by the spring clip 20f extending into slots 20s of strip 20.

The rigid members are specifically described herein as steel strips which preferably have been phosphate treated or zinc coated to provide them with a uniform clean surface for improved attachment to the phenolic adhering resin. However, the invention is considered equally applicable to strips, brackets or other structures of other metals such as brass or bronze or of other solid or rigid materials.

The fibrous glass body may be molded and simultaneously adhered under the precepts of this invention directly to a structural element such as a post for use as an "A" pillar. Still another alternate utility of the invention is to complete a rigid structure such as a hollow square post with the fibrous glass body serving as one side thereof as illustrated in FIG. 6. In all of these cases the molding process would remain substantially the same and a basic feature of the invention wherein the rigidity of the rigid structure would be continued into adjoining portions of the fibrous body would be retained.

Many types of fastening elements may be integrated with a fibrous glass body as well as steel elements or structures which could be welded to adjoining steel elements. With small steel plates integrated with the fibrous glass body, the unit could be held in place with magnets.

This invention is of course adaptable for practice with other forms of molded bodies of fibrous glass besides the crash pad specifically described herein. These alternate forms could include molded acoustical, thermal, filtering, and merely ornate articles and could be panels or of other varied shapes.

As may be concluded from the preceding applicants have accomplished the objects of their invention through the creation of new composite structures having unique features and valuable utility.

While those skilled in the art may perceive modified methods of reaching the goals of the invention and varied forms of the products derived therefrom, such enlargements of the invention should lie within the range and spirit of the accompanying claims.

We claim:

1. A composite article comprising a generally low-density, air-permeated, synthetic resin impregnated fibrous glass body and a rigid, elongated, metallic mounting member adhesively attached along one side of its elongated dimension to a surface portion of the fibrous glass body, at least a part of the fibrous glass body contiguous with said surface portion being of high density and having strength comparative to that of the metallic mounting member.

2. A composite article according to claim 1 in which the member is a flat strap and is embedded in the fibrous glass body to the extent that its outer planar surface is coextensive with the adjacent surface of the fibrous glass body.

3. A composite article according to claim 1 in which the surface portion of the fibrous glass body is of irregular contour and the mounting member is shaped to follow said irregular contour.

4. A composite article according to claim 1 in which the fibrous glass body and the mounting member are shaped to adapt the article to being joined to a hollow metallic structure and to complete said structure by constituting one side thereof.

5. A composite article according to claim 1 in which the mounting member extends substantially across one dimension of the fibrous glass body whereby it restrains the body from expansion in said dimension.

6. A composite article according to claim 5 in which the ends of the mounting member are attached to high-density portions of the fibrous glass body and the member spans a low-density portion of the body between said high-density portions.

7. A composite article comprising a low-density body of glass fibers, a bonding material, constituting 24 percent by weight of the low-density body, interbonding said fibers into integrated relation, and a metal mounting member adhered to a portion of said body by a quantity of said bonding material at the interface between said member and said body portion.

* * * * *